United States Patent
Torres Gutierrez et al.

(10) Patent No.: US 9,574,629 B2
(45) Date of Patent: Feb. 21, 2017

(54) BRAKE ROTORS WITH INCLINED POSTS

(71) Applicant: FORD GLOBAL TECHNOLOGIES, LLC, Dearborn, MI (US)

(72) Inventors: Fernando Octavio Torres Gutierrez, Tlalnepantla de Baz (MX); Juan Carlos Martinez Laurent, San Mateo Otzacatipan/Toluca (MX)

(73) Assignee: FORD GLOBAL TECHNOLOGIES, LLC, Dearborn, MI (US)

(*) Notice: Subject to any disclaimer, the term of this patent is extended or adjusted under 35 U.S.C. 154(b) by 0 days.

(21) Appl. No.: 14/681,537

(22) Filed: Apr. 8, 2015

(65) Prior Publication Data

US 2016/0298708 A1    Oct. 13, 2016

(51) Int. Cl.
   *F16D 65/12*    (2006.01)
   *F16D 65/02*    (2006.01)

(52) U.S. Cl.
   CPC ..... *F16D 65/128* (2013.01); *F16D 2065/1328* (2013.01)

(58) Field of Classification Search
   CPC .................. F16D 65/12; F16D 65/128
   USPC ............. 188/18 A, 218 XL, 264 A, 264 AA
   See application file for complete search history.

(56) References Cited

U.S. PATENT DOCUMENTS

| | | | |
|---|---|---|---|
| 3,899,054 A | 8/1975 | Huntress et al. | |
| 4,865,167 A | 9/1989 | Giorgetti et al. | |
| 4,928,798 A | 5/1990 | Watson et al. | |
| 5,526,905 A * | 6/1996 | Shimazu | F16D 65/128 188/218 XL |
| 5,542,503 A | 8/1996 | Dunn et al. | |
| 6,216,829 B1 * | 4/2001 | Daudi | F16D 65/12 188/218 XL |
| 9,127,734 B2 * | 9/2015 | Hanna | F16D 65/12 |
| 2010/0206674 A1 | 8/2010 | Monsere et al. | |
| 2011/0100774 A1 * | 5/2011 | Seuser | F16D 65/128 188/218 XL |
| 2011/0108378 A1 | 5/2011 | Leone et al. | |
| 2011/0214950 A1 * | 9/2011 | Fujimoto | B61H 5/00 188/218 XL |

* cited by examiner

*Primary Examiner* — Christopher Schwartz
(74) *Attorney, Agent, or Firm* — Jones Robb, PLLC; Raymond L. Coppiellie

(57) ABSTRACT

A brake rotor for attachment to a wheel of a vehicle may include an inner friction member and an outer friction member. The brake rotor may further include a plurality of posts connecting the inner friction member to the outer friction member, each post inclining at an angle between the inner friction member and the outer friction member.

24 Claims, 7 Drawing Sheets

BRAKE ROTORS WITH INCLINED POSTS

TECHNICAL FIELD

The present disclosure relates generally to vehicle brake rotors. More specifically, the present disclosure relates to ventilated brake rotors with inclined posts.

BACKGROUND

Brake rotors, or brake disks, are arranged to be mounted to and rotate with a wheel hub of a vehicle as part of the vehicle's braking system. Brake rotors, for example, generally include two oppositely-facing annular friction surfaces which, during operation of the brakes, are engaged by two blocks of friction material (e.g., brake pads) that are moved towards one another into contact with the two friction surfaces so that frictional forces occur and slow the rotation of the rotor, and hence the wheel of the vehicle. These frictional forces, however, may also cause the rotors, brake pads, and caliper (which houses the brake pads and fits over the rotor) to become very hot, which may lead to reduced braking efficiency. High temperatures, for example, may cause problems such as brake fade (temporary loss of braking due to the reduction of the friction coefficient between the friction material and the brake rotor), brake fluid vaporization, component wear (including thermal deformation of the brake rotors), and thermal judder (vibrations that the driver can feel and hear).

In order to reduce temperature/heat accumulation in the brake rotors that is caused by the frictional forces, rotors may include, for example, vents that are cast into the edge of the rotor that allow the heat that has built up on the metal of the rotor to escape. Conventional ventilated rotors may include, for example, friction members (which carry the oppositely-facing annular friction surfaces) that are arranged in a spaced-apart parallel relationship. The friction members are joined by fins (see, e.g., FIG. 1) and/or posts (see, e.g., FIG. 2) therebetween, which form cooling ducts extending radially and outwardly of the rotor. The cooling ducts are arranged so that, as the rotor is rotated, air passes through the ducts and acts to cool the friction members.

Although conventional ventilated brake rotor designs may reduce the amount of temperature/heat accumulation in the rotors, to help improve the performance, handling, and fuel economy of the vehicle, there is still a continued need to present new ventilated brake rotor designs that also reduce the weight of the rotor. It may, therefore, be advantageous to provide an improved ventilated brake rotor design, which provides a rotor with sufficient stiffness and a decreased weight.

SUMMARY

In accordance with various exemplary embodiments, a brake rotor for attachment to a wheel of a vehicle may include an inner friction member and an outer friction member. The brake rotor may further include a plurality of posts connecting the inner friction member to the outer friction member. Each post may incline at an angle between the inner friction member and the outer friction member.

In accordance with various additional exemplary embodiments, a brake rotor for attachment to a wheel of a vehicle may include an inner annular disk and an outer annular disk. The brake rotor may further include a plurality of posts connecting the inner disk to the outer disk. The plurality of posts may be arranged in concentric circles extending radially outward from an axis of rotation of the brake rotor. Each post may have an angle of inclination relative to a vertical axis that is parallel with the axis of rotation.

In accordance with various further exemplary embodiments, a method of manufacturing a brake rotor may include positioning a plurality of posts between an inner friction member of the brake rotor and an outer friction member of the brake rotor. Each post may incline at an angle between the inner friction member and the outer friction member. The inclining of the posts may resist deformation of the brake rotor in response to an applied force from a brake pad.

Additional objects and advantages of the disclosure will be set forth in part in the description which follows, and in part will be obvious from the description, or may be learned by practice of the disclosure. The objects and advantages of the disclosure will be realized and attained by means of the elements and combinations particularly pointed out in the appended claims.

It is to be understood that both the foregoing general description and the following detailed description are exemplary and explanatory only and are not restrictive of the disclosure, as claimed.

The accompanying drawings, which are incorporated in and constitute a part of this specification, illustrate embodiments of the disclosure and together with the description, serve to explain the principles of the disclosure.

BRIEF DESCRIPTION OF THE DRAWINGS

At least some features and advantages will be apparent from the following detailed description of embodiments consistent therewith, which description should be considered with reference to the accompanying drawings, wherein.

Although the following detailed description makes reference to illustrative embodiments, many alternatives, modifications, and variations thereof will be apparent to those skilled in the art. Accordingly, it is intended that the claimed subject matter be viewed broadly.

DESCRIPTION OF THE EMBODIMENTS

Reference will now be made in detail to various embodiments, examples of which are illustrated in the accompanying drawings. The various exemplary embodiments are not intended to limit the disclosure. To the contrary, the disclosure is intended to cover alternatives, modifications, and equivalents.

In a ventilated brake rotor, the particular shapes and spacings of the fins or posts are important for several reasons. For example, the shape and spacing of the fins or posts should not restrict the flow of cooling air through the interior passageways defined therebetween. At the same time, however, the shape and spacing of the fins or posts must provide the rotor with sufficient strength or rigidity (i.e., stiffness), especially at the outer radial portion of the rotor where the brake pads generally apply a greater amount of pressure. Finally, the shape and spacing of the fins or posts should not add unnecessary rotating mass and unsprung weight to the vehicle, which may adversely affect the performance, handling, and fuel economy of the vehicle.

Figure 1:
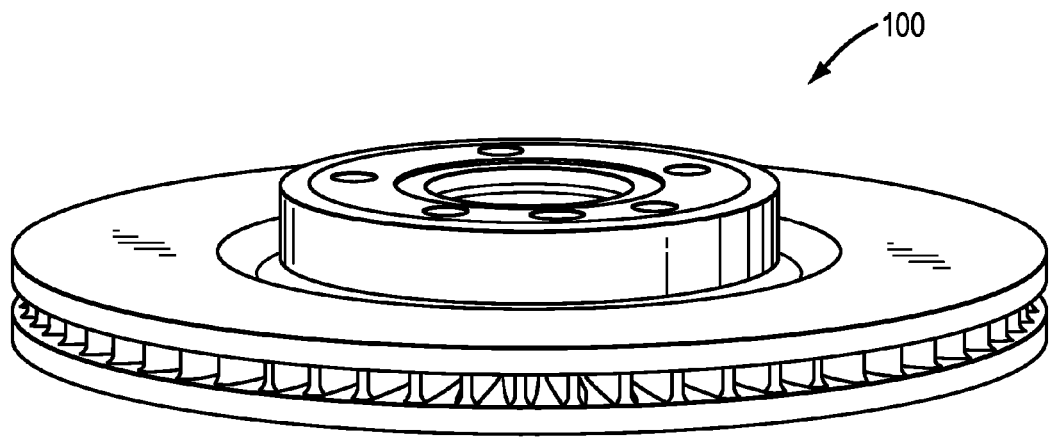
FIG. 1 is a perspective view of a conventional ventilated brake rotor with fins.
Figure 2:
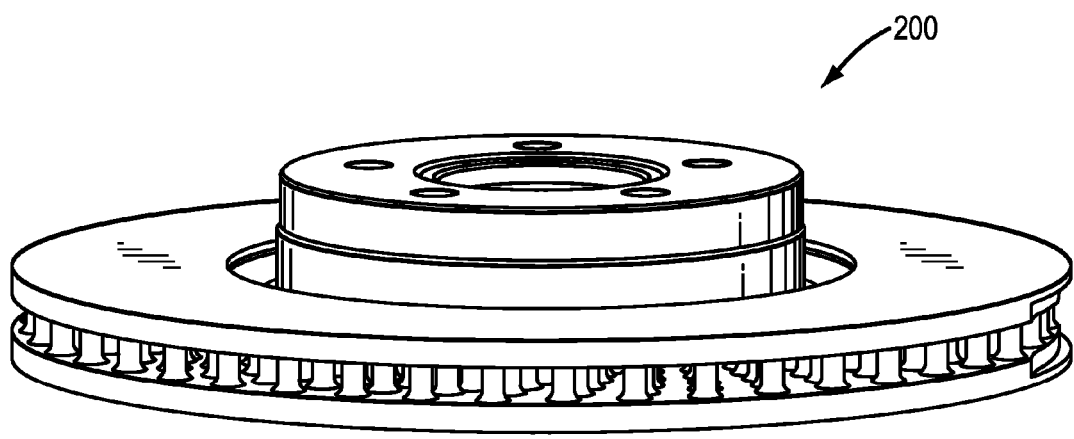
FIG. 2 is a perspective view of a conventional ventilated brake rotor with posts.
Figure 3:
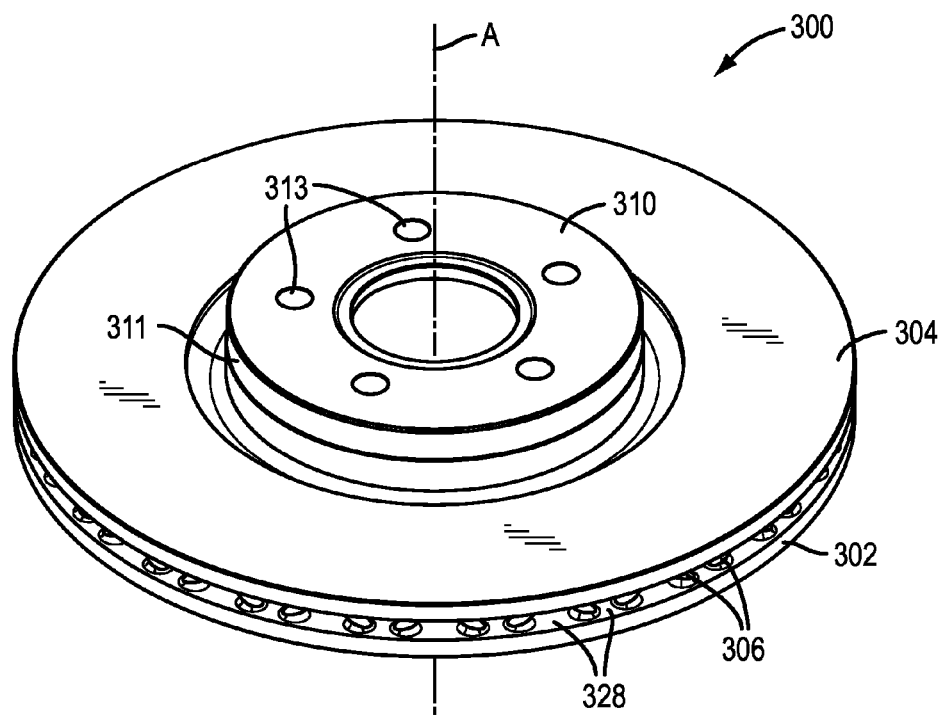
FIG. 3 is a perspective view of an exemplary embodiment of a ventilated brake rotor in accordance with the present disclosure.
Figure 4:
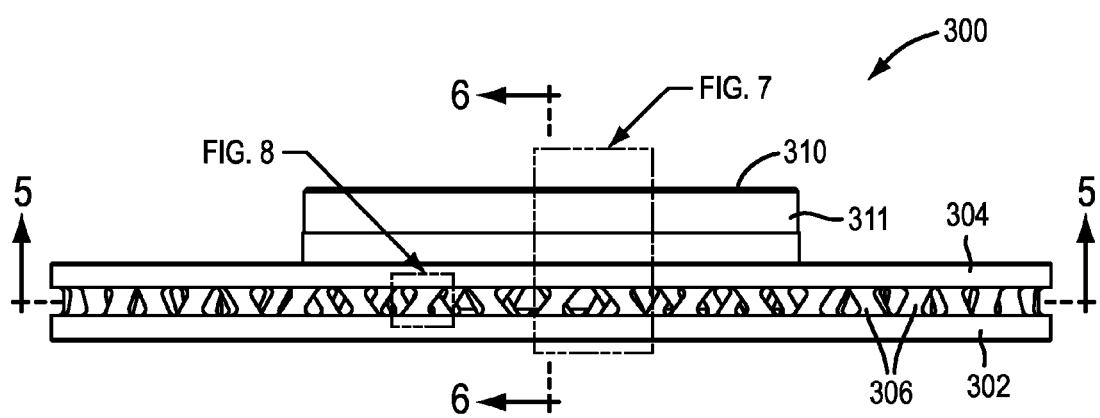
FIG. 4 is a side view of the brake rotor of FIG. 3.

In accordance with various exemplary embodiments, the present disclosure contemplates a ventilated brake rotor having an innovative post design that may reduce the mass of the rotor in comparison with conventional ventilated rotor designs, such as, for example, rotors 100 and 200 illustrated in FIGS. 1 and 2, while still achieving adequate rotor stiffness. For instance, the exemplary embodiments described herein utilize posts that have an angle of inclination relative to an axis of rotation of the rotor. Various exemplary embodiments described herein, for example, contemplate a ventilated brake rotor comprising a plurality of posts connecting an inner friction member of the rotor to an outer friction member of the rotor, wherein each post inclines at an angle between the inner friction member and the outer friction member. Utilizing a design with posts (which minimizes the amount of mass placed between the friction members while providing more openings for air flow) may, for example, reduce the overall mass of the rotor (e.g., in comparison with a conventional rotor with fins). Inclining the posts may increase the stiffness of the rotor (i.e., providing a stronger and more rigid rotor), thus resulting in the use of fewer posts to achieve the required amount of stiffness, which may also reduce the overall mass of the rotor (e.g., in comparison with a conventional rotor with posts).

FIGS. 3-8 illustrate an exemplary embodiment of a ventilated brake rotor 300 in accordance with the present disclosure. The brake rotor 300 includes an inner friction member 302 that is connected to an outer friction member 304 by a plurality of posts 306. The brake rotor 300, for example, further includes a hub mounting surface 310 that extends from the outer friction member 304 to facilitate connection of the brake rotor 300 to a wheel (not shown) of a motor vehicle (not shown). As best shown in the cross-sectional view of FIG. 6, the hub mounting surface 310 may be connected to the outer friction member 304 of the rotor 300 via, for example, a neck portion 311. The hub mounting surface 310 may, for example, include a plurality of bore holes 313, which are configured to receive lug bolts (not shown) to attach the hub mounting surface 310 to the wheel of the motor vehicle. In this manner, the inner friction member 302 is configured to face towards the vehicle when the rotor 300 is attached to the wheel, and the outer friction member 304 is configured to face away from the vehicle when the rotor 300 is attached to the wheel. Although the exemplary embodiment of FIGS. 3-8 shows the hub mounting surface 310 extending from the outer friction member 304, the present disclosure also contemplates various embodiments in which the hub mounting surface extends from the inner friction member 302 as would be understood by those of ordinary skill in the art.

Figure 5:
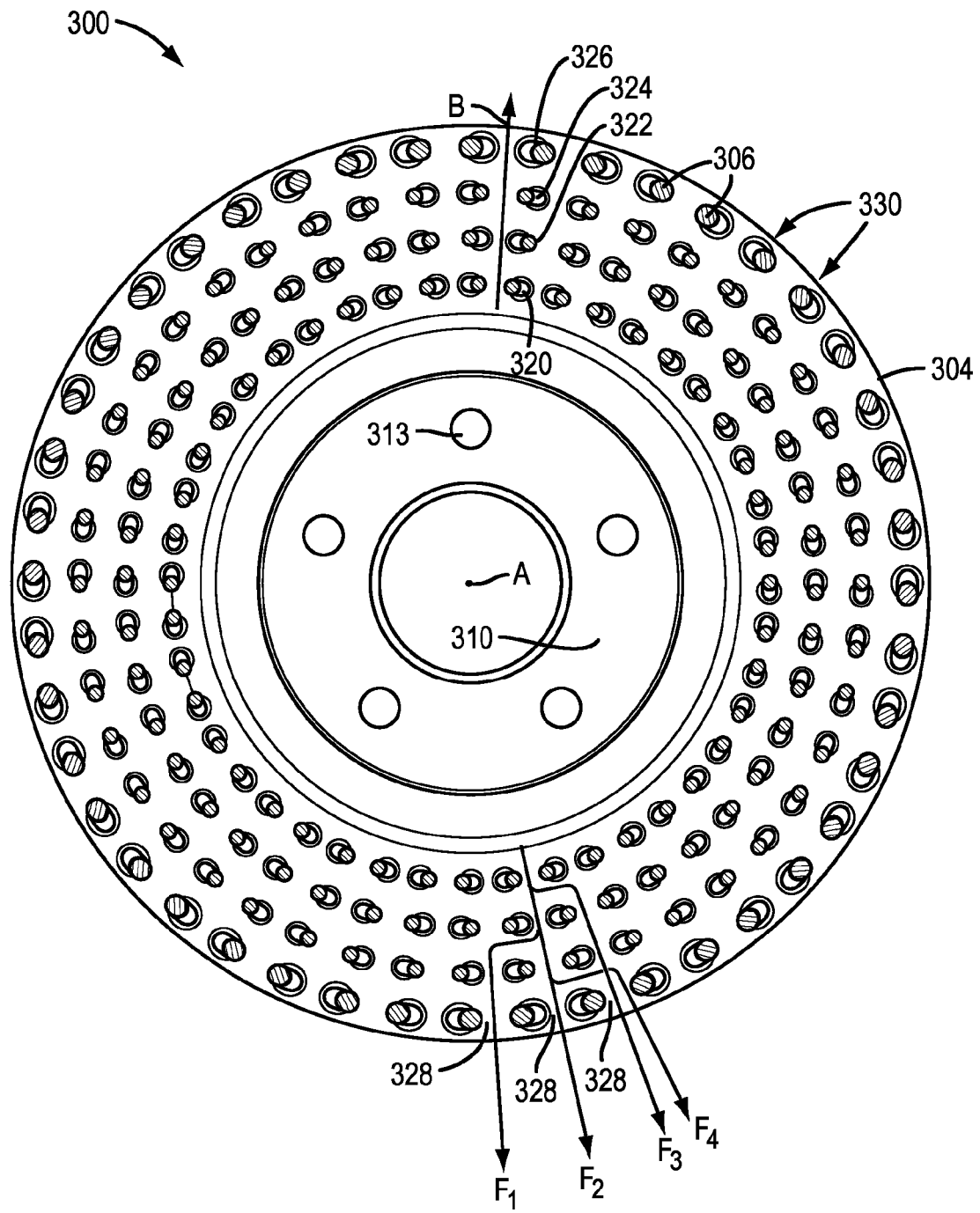
FIG. 5 is a cross-sectional view of the brake rotor of FIG. 3 taken through line 5-5 of FIG. 4.
Figure 6:
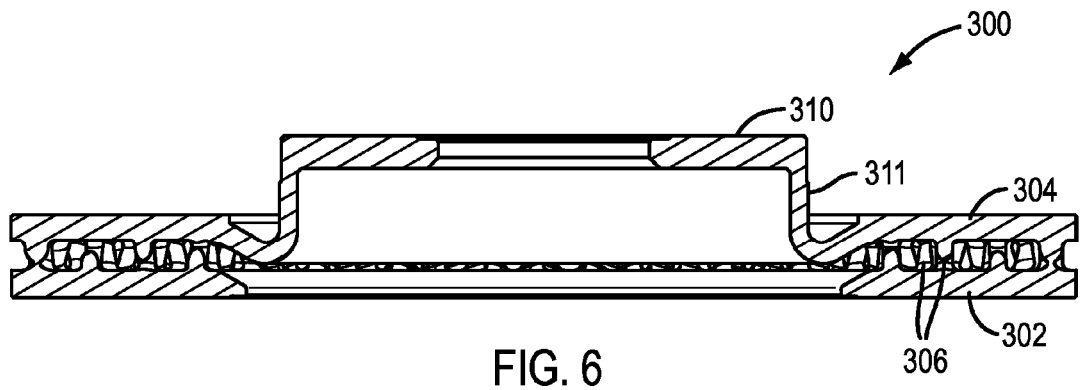
FIG. 6 is another cross-sectional view of the brake rotor of FIG. 3 taken through line 6-6 of FIG. 4.

As illustrated in FIGS. 3-6, in various embodiments of the present disclosure, the inner and outer friction members 302 and 304 may respectively comprise inner and outer annular disks. And, as shown in the cross-sectional view of FIG. 5, the posts 306 are arranged in rows 320, 322, 324, and 326 forming concentric circles extending radially outward from an axis of rotation A of the rotor 300 between the friction members 302 and 304 (i.e., circular rows being separated by radial air gaps). In various embodiments, for example, the posts 306 are arranged into four concentric rows 320, 322, 324, and 326, as illustrated in FIG. 5. And, in various additional embodiments, the posts 306 can be arranged into five or six concentric rows (not shown). In this manner, the posts both connect and provide support to the friction members 302 and 304, while also providing numerous air flow paths, such as, for example, $F_1$, $F_2$, $F_3$, and $F_4$, between the friction members 302 and 304 to vent the rotor 300. In other words, as the rotor 300 is rotated (e.g., when the rotor 300 is attached to a wheel of a motor vehicle), the rotor 300 may function as a centrifugal fan driving air outwardly through the openings created by the posts 306 (e.g., between the friction members 302 and 304) to air outlets 328 at outer edges of the friction members 302 and 304.

Figure 8:
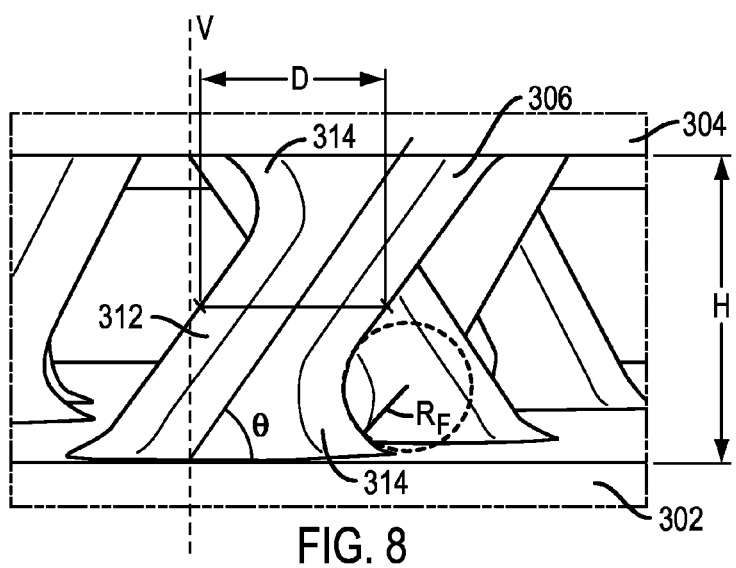
FIG. 8 shows a detailed view of a post of the brake rotor of FIG. 3.
Figure 9:
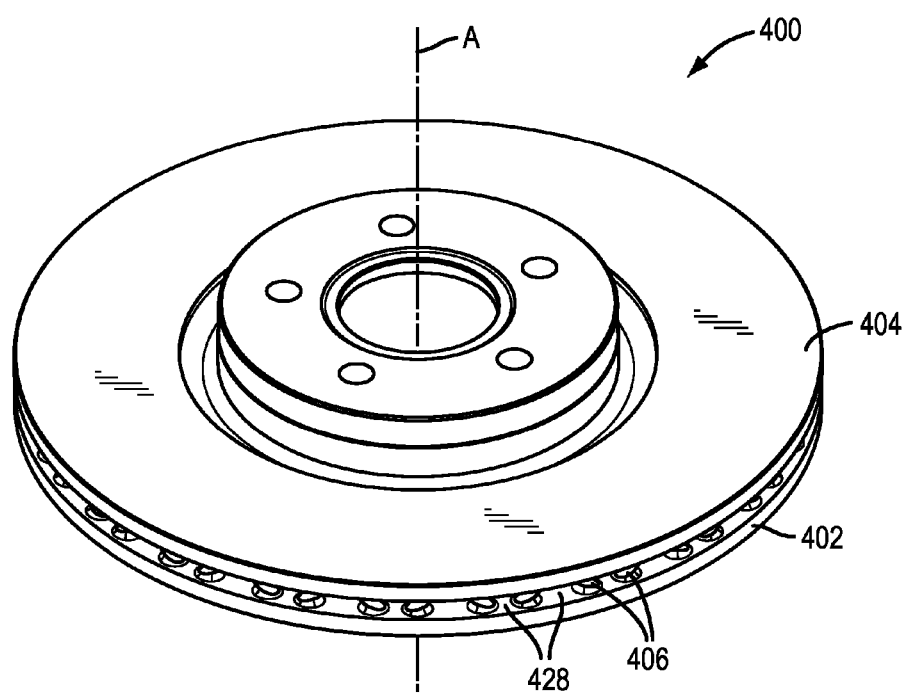
FIG. 9 is a perspective view of another exemplary embodiment of a ventilated brake rotor in accordance with the present disclosure.
Figure 10:
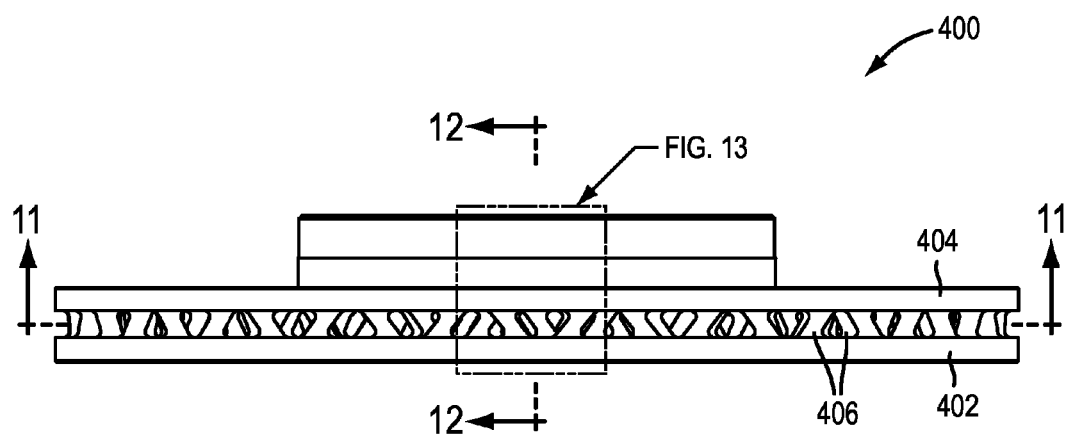
FIG. 10 is a side view of the brake rotor of FIG. 9.

As shown best perhaps in the enlarged view of FIG. 8, in accordance with various embodiments, each of the posts 306 comprises a circular pillar 312 connecting the inner friction member 302 to the outer friction member 304. The pillars 312 have fillets 314 connecting each end of the pillars 312 to a respective friction member 302, 304. In various embodiments, for example, a diameter D of each post 306 ranges from about 8 mm to about 4 mm, and a fillet radius $R_F$ of each post 306 ranges from about 1 mm to about 3 mm. Those of ordinary skill in the art would understand, however, that the above described posts are exemplary only, and may have various shapes, cross-sections, dimensions, configurations, and/or arrangements depending on a particular application and the overall size of the rotor itself. For example, a height H of the posts 306 (and thus the distance between the friction members 302 and 304) is particularly dependent on the overall size of the rotor. For rotors having a diameter ranging from about 258 mm to about 390 mm, for example, the height H of each of post 306 ranges from about 6 mm to about 15 mm.

As above, to increase the stiffness of the brake rotor 300, various exemplary embodiments contemplate that each post 306 has an angle of inclination $\theta$ relative to a vertical axis V that is parallel with the axis of rotation A of the rotor 300. In other words, as shown in the enlarged view of FIG. 8, each post 306 inclines at an angle $\theta$ between the inner friction member 302 and the outer friction member 304. In various embodiments, for example, the angle of inclination $\theta$ of each post 306 ranges from about plus or minus 40 degrees to about plus or minus 80 degrees (i.e., depending on if the post is inclining toward the right or to the left with respect to the vertical axis V). In this manner, each post 306 forms an angle $\theta$ that is less than 90 degrees with the friction members 302 and 304, and an absolute of each angle of inclination $\theta$ ranges from about 40 degrees to about 80 degrees. For ease of explanation, whenever the term angle of inclination $\theta$ is hereafter used, it is intended to mean the absolute value of the angle of inclination $\theta$.

As will be understood by those of ordinary skill in the art, however, the posts 306 may have various angles of inclination $\theta$, and may have various arrangements of posts 306 with varying angles of inclination $\theta$. Thus, in accordance with various embodiments, the posts 306 may all incline at the same angle θ (i.e., all have the same angle of inclination θ or the absolute value of each angle of inclination θ may be the same for all of the posts 306.) And, in accordance with various additional embodiments, the posts 306 may incline at different angles (i.e., have differing angles of inclination θ). For example, with reference to FIG. 5, the posts 306 of each row 320, 322, 324, 326 may have the same angle of inclination θ, while the angle of inclination θ of each row 320, 322, 324, 326 increases as the rows extend radially outward along a path B (i.e., the absolute value of the angle of inclination θ of each row 320, 322, 324, 326 increases as the rows extend radially outward). In other words, the angle of inclination θ of the posts 306 of row 326 is greater than the angle of inclination θ of the posts 306 of row 324, the angle of inclination θ of the posts 306 of row 324 is greater than the angle of inclination θ of the posts 306 of row 322, and the angle of inclination θ of the posts 306 of row 322 is greater than the angle of inclination θ of the posts 306 of row 320.

Furthermore, as above, those of ordinary skill in the art will understand that the angle θ may change (having a positive angle versus a negative angle) when the posts 306 are angled in one direction versus another direction (e.g., angled to the right versus the left). In accordance with various embodiments, for example, as illustrated in FIGS. 3-8, the posts 306 of each row 320, 322, 324, and 326 may form columns 330, wherein the posts 306 forming each column are alternately angled in different directions (i.e., alternately angled to the right and left). In other words, the posts 306 of each column 330 may be crossed or have alternating positive and negative angles of inclination θ.

Figure 7:
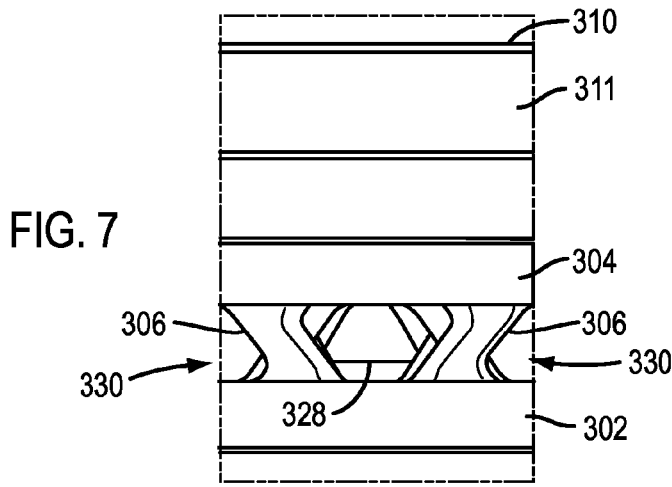
FIG. 7 is an enlarged, partial side view of the brake rotor of FIG. 3.

As illustrated in FIGS. 3-8, in accordance with various exemplary embodiments, the plurality of posts 306 may be arranged into circular rows 320, 322, 324, and 326 extending radially outward from the axis of rotation A of the rotor 300, and the posts 306 of reach row 320, 322, 324, and 326 may be aligned with each other to form columns 330 extending radially outward from the axis of rotation A (see FIGS. 5 and 7). In various embodiments, for example, each of the rows 320, 322, 324, and 326 may include about 40 to 60 posts 306, thereby forming about 40 to 60 columns 330. In this manner, the brake rotors 300 may have between 160 and 360 posts 306 (i.e., depending on the number of rows used and the number of posts 306 included within each row). As above, however, the present disclosure contemplates brake rotors including any number, configuration (i.e., dimension and/or geometry), and/or arrangement of posts 306. Those of ordinary skill in the art would understand, therefore, that the brake rotor 300 illustrated in FIGS. 3-8 is exemplary only and intended to illustrate one embodiment of the present disclosure. Accordingly, brake rotors in accordance with the present disclosure may have various configurations, arrangements, and/or orientations of friction members and posts without departing from the scope of the present disclosure and claims, and are not bound by any specific geometries, arrangements, and/or orientations.

For example, in accordance with various additional embodiments of the present disclosure, a ventilated brake rotor may include a plurality of posts that are offset from one another. As illustrated in FIGS. 9-13, for example, in various embodiments, a brake rotor 400 may include an inner friction member 402 that is connected to an outer friction member 404 by a plurality of posts 406 arranged in rows 420, 422, 424, and 426 forming concentric circles around a rotation axis A of the rotor 400. Similar to the embodiment of FIGS. 3-8, the posts 406 both connect and provide support to the friction members 402 and 404, while also providing numerous air flow paths, such as, for example, paths $F_5$, $F_6$, between the friction members 402 and 404 to vent the rotor 400. Thus, as above, as the rotor 400 is rotated (e.g., when the rotor 400 is attached to a wheel of a motor vehicle), the rotor 400 may function as a centrifugal fan driving air outwardly through the openings created by the posts 406 (e.g., between the friction members 402 and 404) to air outlets 428 at outer edges of the friction members 402 and 404.

Figure 13:
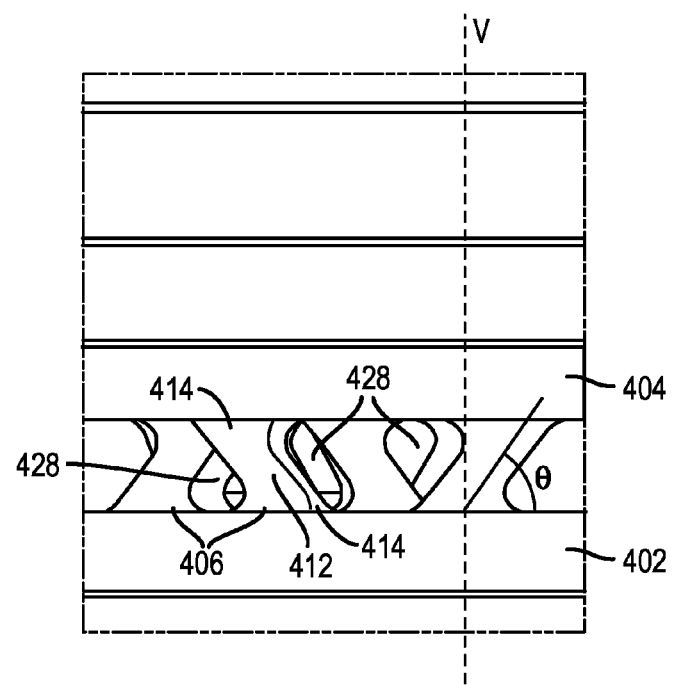
FIG. 13 is an enlarged, partial side view of the brake rotor of FIG. 9.

As shown in the enlarged view of FIG. 13, similar to the embodiment of FIGS. 3-8, each of the posts 406 comprises a circular pillar 412 connecting the inner friction member 402 to the outer friction member 404; and the pillars 412 have fillets 414 connecting each end of the pillars 412 to a respective friction member 402, 404. Also similar to the embodiment of FIGS. 3-8, to increase the stiffness of the brake rotor 400, each post 406 has an angle of inclination θ relative to a vertical axis V that is parallel with the axis of rotation A of the rotor 400.

Figure 11:
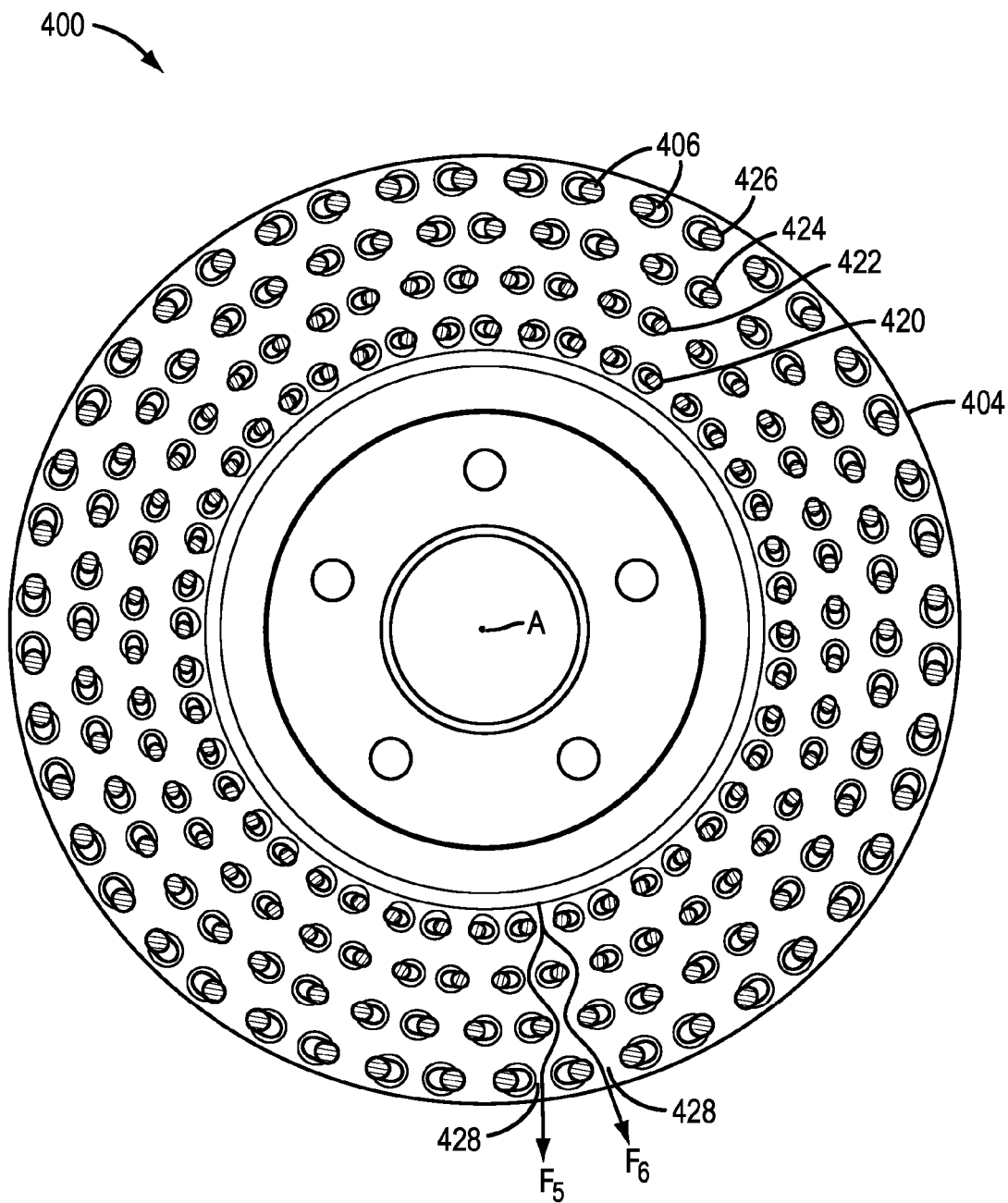
FIG. 11 is a cross-sectional view of the brake rotor of FIG. 9 taken through line 11-11 of FIG. 10.
Figure 12:
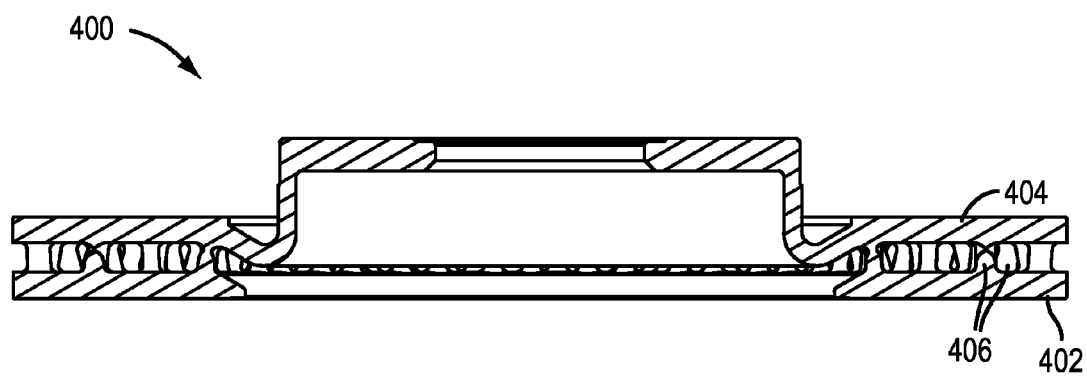
FIG. 12 is another cross-sectional view of the brake rotor of FIG. 9 taken through line 12-12 of FIG. 10.

In contrast to the embodiment of FIGS. 3-8, however, as shown best perhaps in FIGS. 11 and 13, the posts 406 of adjacent rows are offset from one another such that the posts 406 appear to be misaligned instead of forming distinct columns of posts. In accordance with various embodiments, for example, the posts 406 of rows 420 and 424 are aligned and the posts of rows 422 and 426 are aligned, while the respective sets of aligned rows (i.e., 420, 424 and 422, 426) are offset from one another. In other words, rows 420 and 424 are offset from their respective adjacent rows 422 and 426.

Ventilated brake rotors in accordance with the present disclosure have a substantially reduced mass in comparison with conventional ventilated brake rotors, such as, for example, the rotors 100 and 200 illustrated in FIGS. 1 and 2. To verify the expected stiffness results of the disclosed rotors, a ventilated brake rotor in accordance with the present disclosure and similar to the brake rotor 300 illustrated and described above with reference to FIGS. 3-8, having 4 rows of 44 posts (i.e., 44 pillars) for a total of 176 posts, was modeled in a finite element analysis (FEA) solver using ABAQUS software. A reference conventional ventilated brake rotor similar to the brake rotor 100 illustrated in FIG. 1 was also modeled in a FEA model for comparison purposes. All CAD (Computer Aided Design) models were created using CATIA®. The reference brake rotor had 53 fins. The modeled rotor in accordance with the present disclosure weighed about 1000 grams less than the reference rotor with fins.

To test the stiffness of the modeled rotors a 1 N force was applied normal to the friction members of each rotor at a location approximately 5 mm from an outer periphery of each rotor. In other words, the force was applied at the outer radial portion of each rotor to simulate where the brake pads generally apply pressure to the rotors. A displacement of each rotor, in the area where the force was applied, was then measured to obtain the stiffness of each rotor, as will be understood by those of ordinary skill in the art. Based on these stiffness calculations, it was predicted that the rotors in accordance with the present disclosure with inclined posts (i.e., rotor 300 as embodied herein and described with respect to FIGS. 3-8) would provide about 12,300 N/mm of stiffness, whereas the conventional rotor (i.e., rotor 100 described with respect to prior art FIG. 1) would provide about 13,500 N/mm of stiffness. Accordingly, it was determined that although the new rotor design weighed about 10% less than the conventional rotor, it still provided adequate strength and rigidity to meet the required stiffness threshold of about 7,500 N/mm.

Although, a conventional ventilated brake rotor similar to the brake rotor 200 illustrated in FIG. 2 (which has 220 posts compared to the 176 posts of the modeled rotor in accordance with the present disclosure) was not separately modeled, it was also inferred that although the new rotor design weighs less (about 2.5% less) than the conventional rotor with vertical posts (i.e., due to the decreased number of posts), it will also provide adequate strength and rigidity to meet the required stiffness threshold.

It was, therefore, determined that the new rotor design of the present disclosure (i.e., with inclined posts) may reduce the overall mass of the rotor, in comparison with the conventional rotors having fins or vertical posts, by using fewer posts without compromising the stiffness of the rotor. In other words, based on the number of columns used for each rotor design, wherein the conventional rotor with fins had 53 columns (each fin corresponding to a column having about 4 posts for a total of about 212 posts) and the conventional rotor with vertical posts had 44 columns (each column having 5 posts for a total of 220 posts), it was determined that the new rotor design (which had 44 columns, each column having 4 posts for a total of 176 posts) may use about 17% to about 20% fewer posts than the conventional rotors without compromising the stiffness of the rotor.

The present disclosure further contemplates methods of manufacturing a brake rotor, such as, for example, the brake rotors 300 and 400 described above with reference to FIGS. 3-13, in which the stiffness of the rotor may be maintained while decreasing the mass of the rotor. In accordance with various embodiments, for example, a plurality of posts 306, 406 may be positioned between an inner friction member 302, 402 of the brake rotor 300, 400 and an outer friction member 304, 404 of the brake rotor 300, 400. As above, the posts 306, 406 are arranged in rows 320, 322, 324, 326, 420, 422, 424, 426 forming concentric circles around and extending radially outward from a rotation axis A of the rotor 300, 400. In this manner, the posts 306, 406 are positioned to connect and provide support to the friction members 302, 304, 402, 404, while also providing numerous air flow paths between the friction members 302, 304, 402, 404 to vent the rotor 300, 400 (which also serve to decrease the overall mass of the rotor). Thus, as above, as the rotor 300, 400 is rotated (e.g., when the rotor 300, 400 is attached to a wheel of a motor vehicle), the rotor 300, 400 may drive air outwardly through the openings created by the posts 306, 406 to air outlets 328, 428 at outer edges of the friction members 302, 304, 402, 404.

As shown in the embodiment of FIGS. 3-8, in various embodiments, the posts 306 of each row 320, 322, 324, and 326 may be aligned with each other to form columns 330 extending radially outward from the axis of rotation A of the rotor 300. As shown in the embodiment of FIGS. 9-13, in various additional embodiments, the posts 406 of adjacent rows 420 and 422; 422 and 424; and 424 and 426 may be offset from one another such that the posts 406 appear to be misaligned instead of forming columns of posts.

Also as above, to increase the stiffness of the rotor 300, 400 (e.g., since posts are being utilized instead of fins), each post 306, 406 may be inclined at an angle θ between the inner friction member 302, 402 and the outer friction member 304, 404. In other words, each post 306, 406 may have an angle of inclination θ to a vertical axis V that is parallel with the axis of rotation A of the rotor 300, 400 and such inclination may help to resist deformation of the brake rotor 300, 400 in response to an applied force from a brake pad (not shown). Although not wishing to be bound by a particular theory, the inventors believe that the inclination of the posts 306, 406 increases the stiffness of the posts 306, 406 (i.e., compared with the vertical posts) since the loads on the posts 306, 406 are distributed along more than one axis. In other words, when an axial load is applied to the rotor (i.e., from a brake pad), if the rotor has vertical posts, all the forces are transferred in the same direction as the applied load. While, if the rotor has inclined posts, the forces are distributed in both the axial and tangential directions due to the angle of inclination θ of the posts. Furthermore, the tangential reactions of the posts 306 may be compensated by having the posts 306, forming each column 330 of posts 306, alternately angled in different directions (i.e., alternately angled to the right and to the left to cross the posts 306).

The brake rotors 300, 400 may be manufactured using any known methods and/or techniques known to those of ordinary skill in the art. In various embodiments, for example, the brake rotors 300, 400 may be cast from a molten metal, such as, for example, iron that is poured into a mold. In various additional embodiments, the brake rotors 300, 400 may be molded from a composited material, such as, for example, reinforced carbon-carbon, or a ceramic matrix composite.

As would be understood by those of ordinary skill in the art, however, the disclosed methods contemplate manufacturing brake rotors having various configurations, arrangements, and/or orientations of friction members and posts and are not intended to be bound by the exemplary rotors 300, 400 illustrated in the embodiments of FIGS. 3-13.

While the present disclosure has been disclosed in terms of exemplary embodiments in order to facilitate better understanding of the disclosure, it should be appreciated that the disclosure can be embodied in various ways without departing from the principle of the disclosure. Therefore, the disclosure should be understood to include all possible embodiments which can be embodied without departing from the principle of the disclosure set out in the appended claims. Furthermore, although the present disclosure has been discussed with relation to automotive vehicles, those of ordinary skill in the art would understand that the present teachings as disclosed would work equally well for any type of vehicle having a braking system that utilizes brake rotors.

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the written description and claims are approximations that may vary depending upon the desired properties sought to be obtained by the present disclosure. At the very least, and not as an attempt to limit the application of the doctrine of equivalents to the scope of the claims, each numerical parameter should at least be construed in light of the number of reported significant digits and by applying ordinary rounding techniques.

It is noted that, as used in this specification and the appended claims, the singular forms "a," "an," and "the," include plural referents unless expressly and unequivocally limited to one referent. Thus, for example, reference to "a sensor" includes two or more different sensors. As used herein, the term "include" and its grammatical variants are intended to be non-limiting, such that recitation of items in a list is not to the exclusion of other like items that can be substituted or added to the listed items.

It will be apparent to those skilled in the art that various modifications and variations can be made to the system and method of the present disclosure without departing from the scope its teachings. Other embodiments of the disclosure will be apparent to those skilled in the art from consideration of the specification and practice of the teachings disclosed herein. It is intended that the specification and embodiment described herein be considered as exemplary only.

What is claimed is:

1. A brake rotor for attachment to a wheel of a vehicle, comprising:
   an inner friction member;
   an outer friction member; and
   a plurality of posts connecting the inner friction member to the outer friction member, each post inclining at an angle between the inner friction member and the outer friction member.

2. The brake rotor of claim 1, wherein an angle of inclination of each post ranges from about 40 degrees to about 80 degrees.

3. The brake rotor of claim 1, wherein the posts all incline at the same angle.

4. The brake rotor of claim 1, wherein the posts incline at different angles.

5. The brake rotor of claim 1, wherein the inner and outer friction members respectively comprise inner and outer annular disks, and wherein the posts are arranged in rows that form concentric circles extending radially outward from an axis of rotation of the rotor.

6. The brake rotor of claim 5, wherein an angle of inclination of the posts of each row increases as the rows extend radially outward.

7. The brake rotor of claim 5, wherein the posts of each row are aligned with each other to form columns of posts extending radially outward from the axis of rotation of the rotor.

8. The brake rotor of claim 5, wherein the posts of adjacent rows are offset from one another.

9. The brake rotor of claim 5, wherein the posts are arranged into four to six concentric rows.

10. The brake rotor of claim 1, wherein a diameter of each post ranges from about 8 mm to about 4 mm.

11. The brake rotor of claim 1, wherein a fillet radius of each post ranges from about 1 mm to about 3 mm.

12. The brake rotor of claim 1, wherein a diameter of the rotor ranges from about 258 mm to about 390 mm.

13. The brake rotor of claim 12, wherein a height of each post ranges from about 6 mm to about 15 mm.

14. The brake rotor of claim 1, further comprising a hub mounting surface extending from the outer friction member and configured for connection to the wheel of the vehicle.

15. A brake rotor for attachment to a wheel of a motor vehicle, comprising:
   an inner annular disk;
   an outer annular disk; and
   a plurality of posts connecting the inner disk to the outer disk, the plurality of posts being arranged in concentric circles extending radially outward from an axis of rotation of the brake rotor, each post having an angle of inclination relative to a vertical axis that is parallel with the axis of rotation.

16. The brake rotor of claim 15, wherein the posts form columns extending radially outward from the axis of rotation, and wherein the posts forming each column have alternating positive and negative angles of inclination relative to the vertical axis.

17. The brake rotor of claim 15, wherein the angle of inclination of each post ranges from about plus or minus 40 degrees to about plus or minus 80 degrees.

18. The brake rotor of claim 15, wherein an absolute value of each angle of inclination is the same for all posts.

19. The brake rotor of claim 15, wherein the posts have differing angles of inclination.

20. The brake rotor of claim 15, wherein the posts of each circle have the same angle of inclination, and an absolute value of the angle of inclination of each circle of posts increases as the circles extend radially outward.

21. A method of manufacturing a brake rotor, comprising:
   positioning a plurality of posts between an inner friction member of the brake rotor and an outer friction member of the brake rotor, each post inclining at an angle between the inner friction member and the outer friction member,
   wherein the inclining of the posts resists deformation of the brake rotor in response to an applied force from a brake pad.

22. The method of claim 21, wherein the positioning comprises positioning the posts in concentric rows extending radially outward from an axis of rotation of the brake rotor.

23. The method of claim 22, wherein the positioning comprises aligning the posts of each row with each other to form columns of posts extending radially outward from the axis of rotation of the rotor.

24. The method of claim 22, wherein the positioning comprises offsetting the posts of adjacent rows from one another.

* * * * *